United States Patent
Viering et al.

(10) Patent No.: US 11,864,242 B2
(45) Date of Patent: Jan. 2, 2024

(54) ENHANCEMENT TO RACH PROCEDURE

(71) Applicant: Nokia Technologies Oy, Espoo (FI)

(72) Inventors: Ingo Viering, Munich (DE); Ahmad Awada, Munich (DE); Jedrzej Stanczak, Wroclaw (PL); Samuli Heikki Turtinen, Ii (FI)

(73) Assignee: Nokia Technologies Oy, Espoo (FI)

( * ) Notice: Subject to any disclaimer, the term of this patent is extended or adjusted under 35 U.S.C. 154(b) by 39 days.

(21) Appl. No.: 17/634,145

(22) PCT Filed: Aug. 14, 2019

(86) PCT No.: PCT/EP2019/071856
§ 371 (c)(1),
(2) Date: Feb. 9, 2022

(87) PCT Pub. No.: WO2021/028046
PCT Pub. Date: Feb. 18, 2021

(65) Prior Publication Data
US 2022/0322456 A1 Oct. 6, 2022

(51) Int. Cl.
*H04W 74/08* (2009.01)
*H04W 56/00* (2009.01)
*H04W 74/04* (2009.01)

(52) U.S. Cl.
CPC ..... *H04W 74/0841* (2013.01); *H04W 56/001* (2013.01); *H04W 74/04* (2013.01); *H04W 74/0866* (2013.01)

(58) Field of Classification Search
CPC ........ H04L 5/005; H04L 5/006; H04W 74/04; H04W 74/0833; H04W 74/0841; H04W 74/0866
See application file for complete search history.

(56) References Cited

U.S. PATENT DOCUMENTS

2019/0215749 A1 7/2019 Shih et al.
2020/0053794 A1* 2/2020 He .................... H04W 74/0833
(Continued)

FOREIGN PATENT DOCUMENTS

WO 2019/064229 A1 4/2019

OTHER PUBLICATIONS

"3rd Generation Partnership Project; Technical Specification Group Radio Access Network; NR; NR and NG-RAN Overall Description; Stage 2 (Release 15)", 3GPP TS 38.300, V15.6.0, Jun. 2019, pp. 1-99.
(Continued)

*Primary Examiner* — Pao Sinkantarakorn
(74) *Attorney, Agent, or Firm* — Harrington & Smith (57) ABSTRACT

An example embodiment relates to Random Access Channel, RACH, procedure, for example in the New Radio, NR. Random access procedures may be of two types, contention based CBRA and contention free, CFRA. A client device may only perform CBRA fallback when none of the reference signal received strengths, RSRPs, of the synchronization signal blocks, SSBs, which is associated with the CFRA resources is above a predefined threshold, T1. All SSBs and CSI-RS with associated CFRA resources may be below the threshold. Then, the client device may select an SSB or CSI-RS according to a predefined rule and perform CFRA when CFRA resources are associated. Devices, methods and computer programs are disclosed accordingly.

20 Claims, 4 Drawing Sheets

(56) References Cited

U.S. PATENT DOCUMENTS

| | | | | |
|---|---|---|---|---|
| 2020/0100297 A1* | 3/2020 | Agiwal | ............ | H04W 74/0833 |
| 2020/0314913 A1* | 10/2020 | Rastegardoost | ...... | H04W 74/04 |
| 2021/0112604 A1* | 4/2021 | Bao | .................. | H04W 74/0833 |
| 2021/0307078 A1* | 9/2021 | Singh | ............... | H04W 74/0833 |

OTHER PUBLICATIONS

"3rd Generation Partnership Project; Technical Specification Group Radio Access Network; NR; Radio Resource Control (RRC) protocol specification (Release 15)", 3GPP TS 38.331, V15.6.0, Jun. 2019, pp. 1-519.

"3rd Generation Partnership Project; Technical Specification Group Radio Access Network; NR; Physical layer procedures for data (Release 15)", 3GPP TS 38.214, V15.6.0, Jun. 2019, pp. 1-105.

"Random Access Resource selection for CHO", 3GPP TSG-RAN WG2 Meeting #107, R2-19xxxxx, Agenda: 11.9.3.1, Nokia, Aug. 26-30, 2019, 4 pages.

Bryan et al., "JavaScript Object Notation (JSON) Patch", RFC 6902, Internet Engineering Task Force (IETF), Apr. 2013, pp. 1-18.

International Search Report and Written Opinion received for corresponding Patent Cooperation Treaty Application No. PCT/EP2019/071856, dated Apr. 14, 2020, 12 pages.

"3rd Generation Partnership Project; Technical Specification Group Radio Access Network; NR; Medium Access Control (MAC) protocol specification (Release 15)", 3GPP TS 38.321, V15.6.0, Jun. 2019, pp. 1-78.

"Preamble Selection When CFRA Resource Available", 3GPP TSG-RAN WG2 NR AH1807 Meeting, R2-1809894, Agenda: 10.3.1.4.2, vivo, Jul. 2-6, 2018, 3 pages.

* cited by examiner

ENHANCEMENT TO RACH PROCEDURE

RELATED APPLICATION

This application claims priority to PCT Application No. PCT/EP2019/071856, filed on Aug. 14, 2019, each of which is incorporated herein by reference in its entirety.

TECHNICAL FIELD

The present disclosure generally relates to the field of wireless communications. In particular, the present disclosure relates to a client device (and a network node device) for wireless communication, and related methods and a computer programs.

BACKGROUND

Random access procedure can be used in wireless communications technologies, such as long-term evolution (LTE) and new radio (NR). The 5G NR random access procedure between a client device, such as a user equipment, UE, and a network node device, such as next generation nodeb, gNB, includes beam management. Examples of the messages exchanged between the UE and the gNB in 5G NR random access procedure, for example in random access procedure, are described. It is also known as initial cell search procedure. It helps to get the initial uplink grant for the UE and helps in performing synchronization with the gNB (i.e. network). Currently random access may not be effectively used with respect to the UE or with respect to the network.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a client device comprises at least one processor and at least one memory comprising computer program code. The at least one memory and the computer program code are configured to, with the at least one processor, cause the client device to:

receive at least one dedicated random access channel, RACH, preamble indication from a network node device having contention free random access, CFRA, resources configured for at least one synchronization signal block, SSB, or at least one channel state information-reference signal, CSI-RS;

trigger a random access procedure;

check if reference signal received strengths, RSRPs, of at least one SSB and/or of at least one CSI-RS are above, equal to, or below a threshold, wherein at least one SSB or at least one CSI-RS is associated with the CFRA resources;

if all the RSRPs are below or equal to the threshold, select an SSB or CSI-RS following a predefined rule, and perform the CFRA on the selected SSB or CSI-RS when the selected SSB or CSI-RS is associated with the CFRA resources; and if the RSRP of any of the SSBs or CSI-RSs is above the threshold, perform the CFRA on one of the SSBs or CSI-RSs that is above the threshold, when the SSBs or the CSI-RSs are associated with the CFRA resources.

With such configurations, the client device may be able to, for example, reduce delay in accessing to a target cell. Failures in accessing the cell may also be reduced. Client device may further reduce power consumption. The network CFRA resource may also be utilized more effectively, for example already configured resource may be utilized and not ignored. The client device may be able to, for example, utilize available CFRA procedures although the initial threshold for this would not directly support using it. The client device may be able to, for example, directly use CFRA resources when the RSRP is high enough to be above the threshold.

In an example embodiment, alternatively or in addition to the above-described example embodiments, the predefined rule is based on another threshold, T2. With such configurations, the client device may be able to, for example, utilize existing or available CFRA resources on SSB or CSI-RS, and the another threshold may ensure that less strict condition than the original threshold, sometimes being quite high, may apply for inspection.

In an example embodiment, alternatively or in addition to the above-described example embodiments, the at least one memory and the computer program code are configured to, with the at least one processor, cause the client device further to: check if any of the RSRPs are above the another threshold, T2; select one of the SSB or CSI-RS that has RSRP above the T2. With such configurations, the client device may be able to, for example, apply another threshold that is below or equal to the first threshold and usage of CFRA resources may be configured accordingly.

In an example embodiment, alternatively or in addition to the above-described example embodiments, the at least one memory and the computer program code are configured to, with the at least one processor, further cause the client device to: select any SSB or CSI-RS if all the RSRPs are below or equal to the T2. With such configurations, the client device may be able to, for example, use the CFRA resources in any case if they are available for procedure.

In an example embodiment, alternatively or in addition to the above-described example embodiments, the at least one memory and the computer program code are configured to, with the at least one processor, further cause the client device to: perform a contention based random access, CBRA, on the selected SSB if the selected SSB is not associated with the CFRA resources. With such configurations, the client device may be able to, for example, have a fallback access procedure available in case the CFRA resources may not be used.

In an example embodiment, alternatively or in addition to the above-described example embodiments, the at least one memory and the computer program code are configured to, with the at least one processor, further cause the client device to: receive a handover command indicating whether the client device shall use the CFRA resource to perform the CFRA on the selected SSB or CSI-RS when the RSRP is below or equal to the threshold. With such configuration, the network node device may not falsely estimate the beam RSRP to be above the threshold when the client device uses the CFRA.

In an example embodiment, alternatively or in addition to the above-described example embodiments, the at least one memory and the computer program code are configured to, with the at least one processor, further cause the client device to: indicate to a network node device if the RSRP is below or equal to the threshold and whether the CFRA is used. With such configurations, the client device may be able to, for example, report the usage of the CFRA and the RSRP level.

In an example embodiment, alternatively or in addition to the above-described example embodiments, a medium access control, MAC, control element, CE, comprises the indication. With such configurations, the client device may utilize standardized configurations of the communications for reporting the usage of CFRA.

In an example embodiment, alternatively or in addition to the above-described example embodiments, the MAC CE comprises a logical channel indicator, LCID, having the indicator. With such configurations, the client device may utilize standardized configurations of the communications for reporting the usage of CFRA.

In an example embodiment, alternatively or in addition to the above-described example embodiments, L1 uplink control information, UCI, comprises the indication. With such configurations, the client device may utilize standardized configurations of the communications for reporting the usage of CFRA.

In an example embodiment, alternatively or in addition to the above-described example embodiments, the L1 UCI comprises a single bit indication. With such configurations, the client device may indicate the utilization of the CFRA only by using single bit.

In an example embodiment, alternatively or in addition to the above-described example embodiments, the MAC CE further comprises information about the RSRP. With such configurations, the client device may provide for example the level of the RSRP to the network node device for further utilization.

In an example embodiment, alternatively or in addition to the above-described example embodiments, the at least one memory and the computer program code are configured to, with the at least one processor, further cause the client device to: receive a backoff indicator, BI, in a random access response from a network node device; and in case the client device performs a reattempt preamble transmission, perform the CFRA if the RSRP is below or equal to the threshold and if the CFRA resources are configured by the network node device. With such configurations, both the load on the CBRA and random access latency, given the backoff does not apply to the CFRA, may be reduced.

An example embodiment of a client device comprises means for performing: receive at least one dedicated random access channel, RACH, preamble indication from a network node device having contention free random access, CFRA, resources configured for at least one synchronization signal block, SSB, or at least one channel state information-reference signal, CSI-RS; trigger a random access procedure; check if reference signal received strengths, RSRPs, of at least one SSB and/or of at least one CSI-RS are above, equal to, or below a threshold, wherein at least one SSB or at least one CSI-RS is associated with the CFRA resources; if all the RSRPs are below or equal to the threshold, select an SSB or CSI-RS following a predefined rule, and perform the CFRA on the selected SSB or CSI-RS when the selected SSB or CSI-RS is associated with the CFRA resources; and if the RSRP of any of the SSBs or CSI-RSs is above the threshold, perform the CFRA on one of the SSBs or CSI-RSs that is above the threshold, when the SSBs or the CSI-RSs are associated with the CFRA resources.

An example embodiment of a method comprises: triggering a random access procedure;

receiving at least one dedicated random access channel, RACH, preamble indication from a network node device having contention free random access, CFRA, resources configured for at least one synchronization signal block, SSB, or at least one channel state information-reference signal, CSI-RS;

triggering a random access procedure;

checking if reference signal received strengths, RSRPs, of at least one SSB and/or of at least one CSI-RS are above, equal to, or below a threshold, wherein at least one SSB or at least one CSI-RS is associated with the CFRA resources;

if all the RSRPs are below or equal to the threshold, selecting an SSB or CSI-RS following a predefined rule, and performing the CFRA on the selected SSB or CSI-RS when the selected SSB or CSI-RS is associated with the CFRA resources; and if the RSRP of any of the SSBs or CSI-RSs is above the threshold, performing the CFRA on one of the SSBs or CSI-RSs that is above the threshold, when the SSBs or the CSI-RSs are associated with the CFRA resources.

An example embodiment of a computer program product comprises program code configured to perform the method according to any of the above client device related example embodiments, when the computer program product is executed on a computer.

DESCRIPTION OF THE DRAWINGS

The accompanying drawings, which are included to provide a further understanding of the example embodiments and constitute a part of this specification, illustrate example embodiments and together with the description help to explain the principles of the example embodiments. In the drawings.

Like reference numerals are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present disclosure may be constructed or utilized. The description sets forth the functions of the example and the sequence of steps for constructing and operating the example. However, the same or equivalent functions and sequences may be accomplished by different example embodiments.

An example embodiment relates to Random Access Channel, RACH, procedure, for example in the New Radio, NR. Random access procedures may be of two types, contention based CBRA and contention free, CFRA. A client device may only perform CBRA fallback when none of the reference signal received strengths, RSRPs, of the synchronization signal blocks, SSBs, which is associated with the CFRA resources is above a predefined threshold, T1. All SSBs and CSI-RS with associated CFRA resources may be below the threshold. Then, the client device may select an SSB or CSI-RS according to a predefined rule and perform CFRA when CFRA resources are associated.

Optionally for the predefined rule in case at least one of the RSRPs of the SSBs is above another threshold T2, the client device may select that SSB, which has association with CFRA resources, and perform the CFRA on the selected SSB. According to another example embodiment, the client device may optionally select any SSB, which has association with CFRA resources, and perform CFRA on this SSB.

According to an example embodiment when the network node device configures the client device with dedicated CFRA resources that are associated with CSI-RS, instead of the SSB, CSI-RS may be utilized in the RACH procedure.

If none of the CSI-RS or SSB, associated with CFRA, has an RSRP which is above T1, the client device can still perform CFRA, instead of CBRA, if the client device selects an SSB that is associated with CFRA resources that have been explicitly provided by the network.

According to an example embodiment, the client device checks all SSBs with CFRA resources and/or all CSI-RS with CFRA resources against a threshold. If any of them is above the threshold, CFRA may be performed. When none of them is above the threshold, conventionally the client device would select an SSB according to some rules, and performs CBRA.

According example embodiment, the client device select an SSB according to the predefined rule, and performs CFRA if CFRA resources are available for the selected SSB. Furthermore, the client device may be allowed to select a CSI-RS with CFRA resources and performs CFRA. Optionally the client device may perform CBRA if the selected SSB has no CFRA resources.

According to example embodiment, if all the RSRPs are below or equal the threshold, the client device may select an SSB or CSI-RS following a predefined rule and perform the CFRA on the selected SSB or CSI-RS when the selected SSB or CSI-RS is associated with the CFRA resources.

Figure 1A:
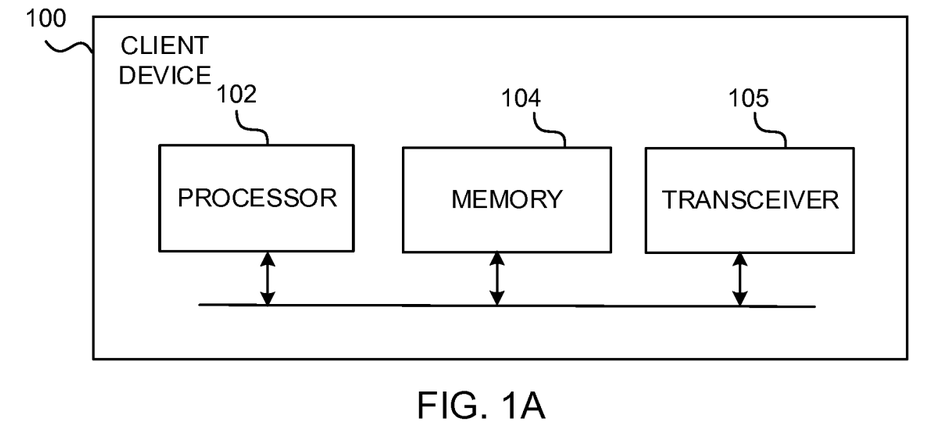
FIG. 1A shows an example embodiment of the subject matter described herein illustrating a client device configured for RACH procedure.

FIG. 1A is a block diagram of a client device 100 configured for RACH procedure in accordance with an example embodiment.

The client device 100 comprises one or more processors 102, and one or more memories 104 that comprise computer program code. The client device 100 may also comprise a transceiver 105, as well as other elements, such as an input/output module (not shown in FIG. 1A), and/or a communication interface (not shown in FIG. 1A).

According to an example embodiment, the at least one memory 104 and the computer program code are configured to, with the at least one processor 202, cause the client device 200 to perform the operations and functions described in the example embodiments above. For example to determine that all SSBs and CSI-RS with associated CFRA resources are below the threshold, and furthermore to select an SSB or a CSI-RS and perform CFRA when CFRA resources are associated. Further operations may be configured on the client device 100 as described below.

Although the client device 100 may be depicted to comprise only one processor 102, the client device 100 may comprise more processors. In an example embodiment, the memory 104 is capable of storing instructions, such as an operating system and/or various applications.

Furthermore, the processor 102 is capable of executing the stored instructions. In an example embodiment, the processor 102 may be embodied as a multi-core processor, a single core processor, or a combination of one or more multi-core processors and one or more single core processors. For example, the processor 102 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 102 may be configured to execute hard-coded functionality. In an example embodiment, the processor 102 is embodied as an executor of software instructions, wherein the instructions may specifically configure the processor 202 to perform the algorithms and/or operations described herein when the instructions are executed.

The memory 104 may be embodied as one or more volatile memory devices, one or more non-volatile memory devices, and/or a combination of one or more volatile memory devices and non-volatile memory devices. For example, the memory 104 may be embodied as semiconductor memories (such as mask ROM, PROM (programmable ROM), EPROM (erasable PROM), flash ROM, RAM (random access memory), etc.).

The client device 100 may be any of various types of devices used directly by an end user entity and capable of communication in a wireless network, such as user equipment (UE). Such devices include but are not limited to smartphones, tablet computers, smart watches, lap top computers, Internet-of-Things (IoT) devices, etc. The client device 100 may include e.g. a mobile phone, a smartphone, a tablet computer, a smart watch, or any hand-held or portable device or any other apparatus, such as a vehicle, a robot, or a repeater. As said, the client device 100 may also be referred to as a user equipment (UE) in the description. The client device 100 may communicate with the network node device 110 via e.g. an air/space born vehicle communication connection, such as a service link.

Figure 1B:
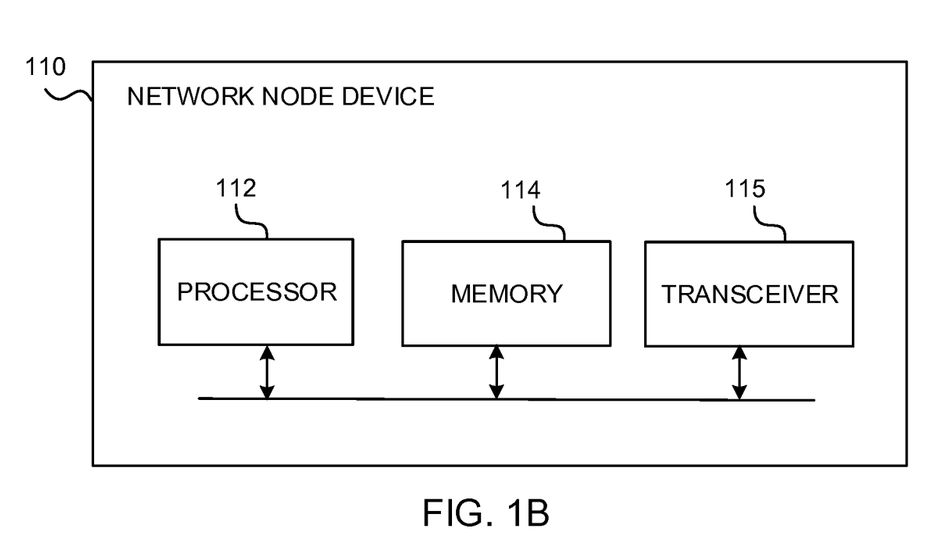
FIG. 1B shows an example embodiment of the subject matter described herein illustrating a network node device configured for RACH procedure.

FIG. 1B is a block diagram of a network node device 110 configured for RACH procedure in accordance with an example embodiment.

The network node device 110 comprises one or more processors 112, and one or more memories 114 that comprise computer program code. The network node device 110 may also comprise a transceiver 115, as well as other elements, such as an input/output module (not shown in FIG. 1B), and/or a communication interface (not shown in FIG. 1B).

According to an example embodiment, the at least one memory 114 and the computer program code are configured to, with the at least one processor 112, cause the network node device 110 to perform the operations and functions described in the example embodiments. For example, to explicitly provide CFRA resources associated with SSB or CSI-RS to the client device 100.

Although the network node device 110 is depicted to comprise only one processor 112, the network node device 110 may comprise more processors. In an example embodiment, the memory 114 is capable of storing instructions, such as an operating system and/or various applications.

Furthermore, the processor 112 is capable of executing the stored instructions. In an example embodiment, the processor 112 may be embodied as a multi-core processor, a single core processor, or a combination of one or more multi-core processors and one or more single core processors. For example, the processor 112 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 112 may be configured to execute hard-coded functionality. In an example embodiment, the processor 112 is embodied as an executor of software instructions, wherein the instructions may specifically configure the processor 212 to perform the algorithms and/or operations described herein when the instructions are executed.

The memory 114 may be embodied as one or more volatile memory devices, one or more non-volatile memory devices, and/or a combination of one or more volatile memory devices and non-volatile memory devices. For example, the memory 114 may be embodied as semiconductor memories (such as mask ROM, PROM (programmable ROM), EPROM (erasable PROM), flash ROM, RAM (random access memory), etc.).

The network node device 110 may be a base station. The base station may comprise, for example, a fifth-generation base station (gNB) or any such device providing an air interface for client devices 100 to connect to the wireless network via wireless transmissions.

According to exemplary embodiment, RACH procedure may be triggered to start to RACH access. The Random Access procedure may be triggered by a number of events: initial access from RRC Idle mode, RRC connection re-establishment procedure, handover, downlink (DL) or uplink (UL) data arrival during RRC Connected when the UL synchronization status is non-synchronized, UL data arriving during RRC Connected where there are no Physical Uplink Control Channel (PUCCH) resources for Scheduling Request (SR) available, SR failure, Request by RRC upon synchronous reconfiguration, Transition from RRC inactive, to establish time alignment of Secondary Cell addition in dual connectivity, Request for Other System Information (SI), beam failure recovery. These are only some of the discussed examples of triggering RACH procedures.

As discussed above, the random access procedure may take two distinct forms: Contention-Based Random Access (CBRA) and Contention-Free Random Access (CFRA), for example as shown in FIGS. 2A and 2B.

Figure 2A:
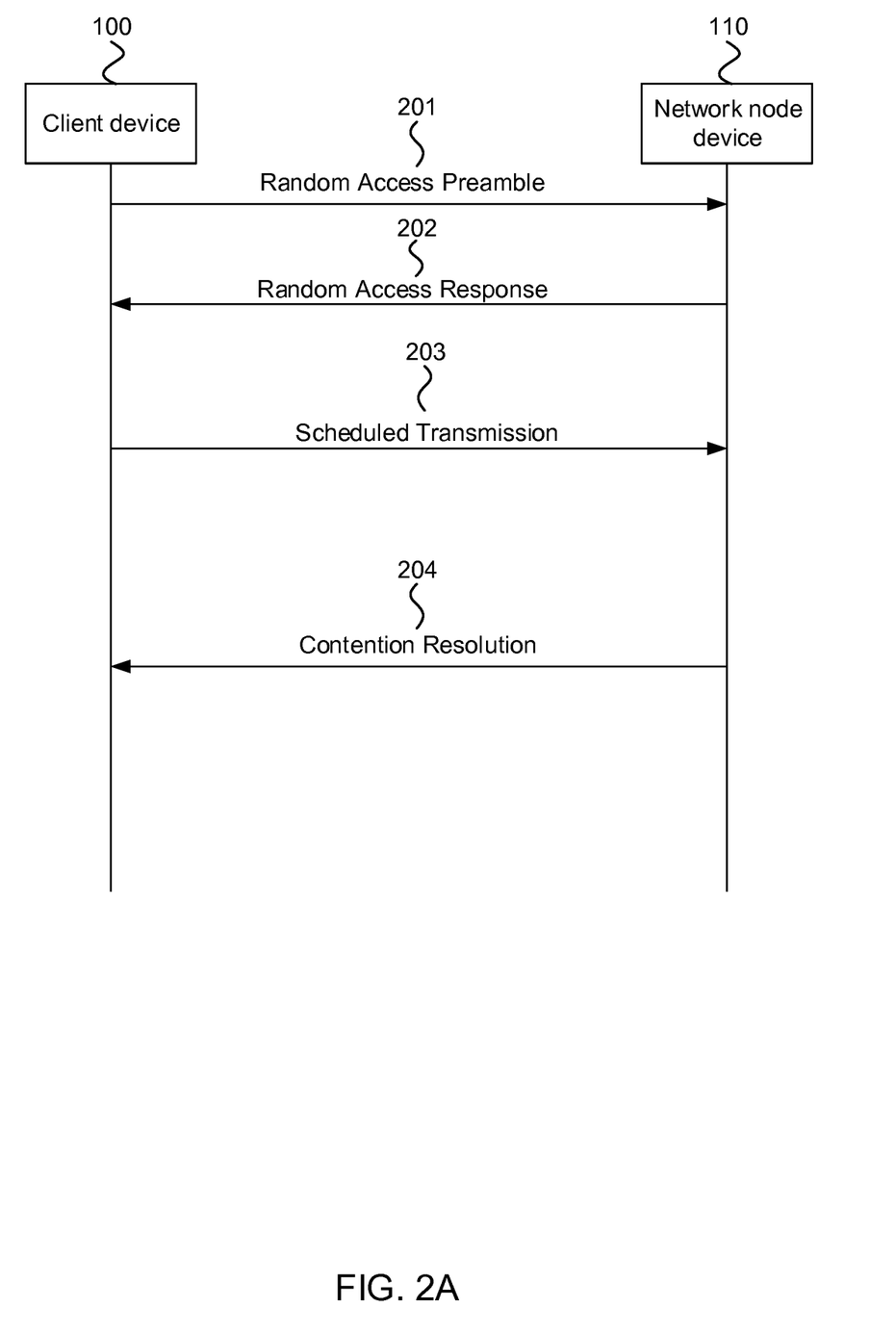
FIG. 2A shows an example embodiment of the subject matter described herein illustrating a signaling diagram for contention based random access procedure.
Figure 2B:
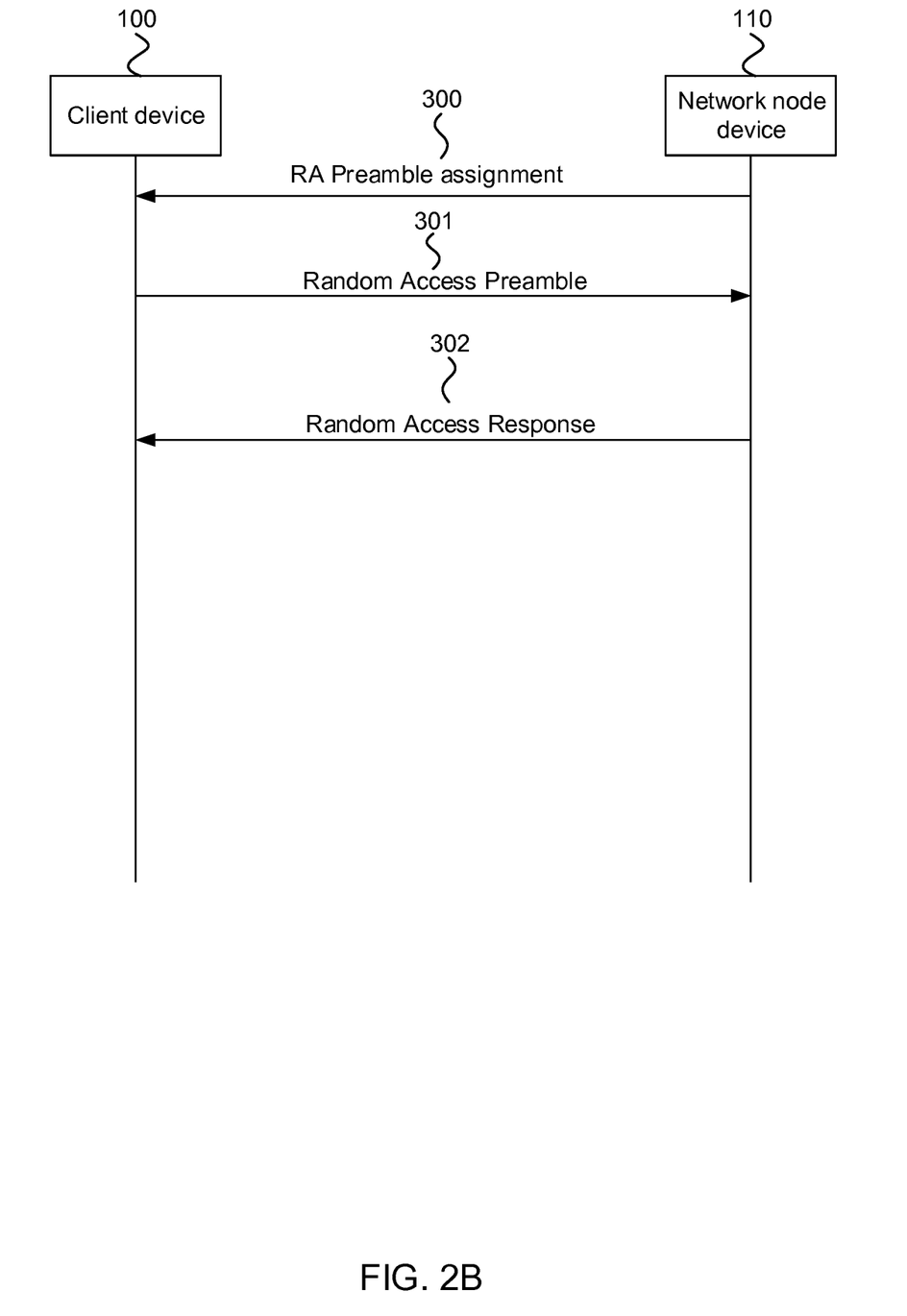
FIG. 2B shows an example embodiment of the subject matter described herein illustrating a signaling diagram for contention free random access procedure.

The operations of the CBRA shown in FIG. 2A are as follows: In operation 201, the client device 100 selects one RACH preamble out of a configured set and transmits the preamble in one of the pre-determined RACH occasions to the network node device 110.

In operation 202, the network node device 110 sends a Random Access Response (RAR) generated by Medium Access Control (MAC) layer. The RAR provides timing advance, initial UL grant to send Msg3 and assignment of temporary Cell-Radio Network Temporary Identifier (CRNTI).

Using the UL grant provided in RAR, the client device 100 sends Msg3 to the network node device 110. The content for the operation 203 depends on whether the client device 100 performs initial access (message would be RRCSetupRequest), RRC re-establishment (message would be RRCReestablishment), or handover (message would be RRCReconfigurationComplete).

Contention resolution is performed in operation 204. Client device 100 that has lost the contention, for example, due to possible collision in preamble transmission, have to repeat the RACH procedure.

According to example embodiment, the client device 100 may perform CBRA procedure as discussed in examples below. For example, in case there is no CFRA associated SSB available, and the client device 100 has detected this option.

The operations of CFRA are shown in FIG. 2B and may be described as follows: In operation 300 the network node device 110 configures the client device 100 with dedicated RACH preamble. According to example embodiment, the client device 100 may utilize the explicitly configured CFRA accordingly, in case the client device 100 check it is available.

When performing the RACH access in operation 301, the client device 100 transmits the dedicated RACH preamble in one of the pre-configured RACH occasion.

The RACH access procedure is completed when client device 100 successfully receives the RAR in operation 302.

During the handover from source to target cell, the client device 100 is typically configured to perform CFRA toward the target cell. For this, the target cell indicates to the client device 100 in the handover command dedicated RACH preambles to be used for accessing the target cell. Those can be associated either with SSBs or CSI-RSs.

If the client device 100 has been explicitly configured by the network node device 100 (for example in handover command) with CFRA resources that are associated with SSB and at least one of these SSBs has RSRP above certain predefined threshold T1, then the client device 100 selects an SSB among the associated SSBs having RSRP above threshold T1. The client device 100 then uses the dedicated CFRA resources corresponding to selected SSB for performing the random access. The same principles applies when the network node device 110 configures the client device 100 with dedicated CFRA resources that are associated with CSI-RS.

If none of the SSB or CSI-RS associated with CFRA has an RSRP above the threshold T1, the client device 100 may fallback to perform CBRA in one option. Herein, the client device 100 checks first if at least one of the SSBs with an RSRP above another threshold T2 is available: If yes, the client device 100 selects an SSB with RSRP above threshold, otherwise the client device 100 can select any SSB.

Conventionally in comparative examples in both cases, the UE performs CBRA on the selected SSB.

In some cases, this selection of SSB or CSI-RS and the corresponding CBRA or CFRA resources may not lead to the optimal client device and network node device behavior.

For example in conventional comparative example, when Threshold T1=Threshold T2=T which may be the case when the RACH is triggered because of a HO and CFRA resources are associated with SSB:

The network node device configures CFRA resources for SSB 1 and 2 among SSBs 1, . . . , N.
SSB 1 and 2 have RSRP below threshold T and none of the remaining SSBs (3, . . . , N) has an RSRP above T.
Client device happens to select SSB 1 or SSB 2 as it has the e.g. strongest RSRP.

In this comparative example, the client device would perform CBRA on SSB1 or SSB 2 although the client device has been configured with CFRA for SSB1 and SSB 2.

Performing CBRA instead of CFRA on the same SSB in this case has the following drawbacks:

CBRA is subject to collision, which may delay the access of the client device to the target cell and may even lead to handover failure if subsequent RACH collisions occur.

CBRA may increase client device power consumption in case of collisions as the client device has to repeat the RACH access procedure.

The reservation of CFRA resources for SSB 1 and SSB 2 has been in vain leading to waste of resources.

In particular, if the threshold T is configured generally too high in the conventional comparative example, CFRA will practically never be used on the cell edge, since CBRA is always chosen when all beams are below the threshold.

According to an example embodiment, when RSRP is below the threshold T1, the client device 100 can inspect whether CFRA resources have been explicitly provided by the network device 110. In this case, the client device 100 may perform the CFRA directly on the SSB or CSI-RS. Consequently, client device 100 may avoid CBRA procedure. The possible collision and delay may be avoided. Client device 100 may consume less power and process SSB or CSI-RS based on CFRA directly. The network resources of the network device 110 for CFRA resources relating to SSB may be utilized more efficiently, and are not performed in vain.

As said above in particular, if the threshold T is configured too high, CFRA will practically never be used, for example on the cell edge, since CBRA is always chosen when all beams (the RSRPs) are below the threshold T1. According to the example embodiment, even when the threshold T is high, client device 100 is able to utilize CFRA for those SSBs having CFRA configuration by the network node device 110.

For the legacy handover, the time between the source cell selecting the CFRA resource and the client device 100 accessing the target cell is comparatively small. Hence, configuring a small threshold T (and thereby significantly preferring the prepared CFRA resources) does not create significant problems, since the prepared CFRA resource are very likely to be still valid.

However, with a conditional handover, there might be considerable time between the target cell selecting the CFRA resources and the client device accessing the target cell. Consequently, there may be a likelihood that the selected CFRA resources are no longer valid. A too small threshold T will lead to handover failures in this case since the client device significantly prioritizes the configured, but invalid resources. A larger threshold T will lead to unnecessary fallback to CBRA. Example embodiment RACH procedure operates significantly more efficient than conventional RACH procedure for this handover.

Figure 3:
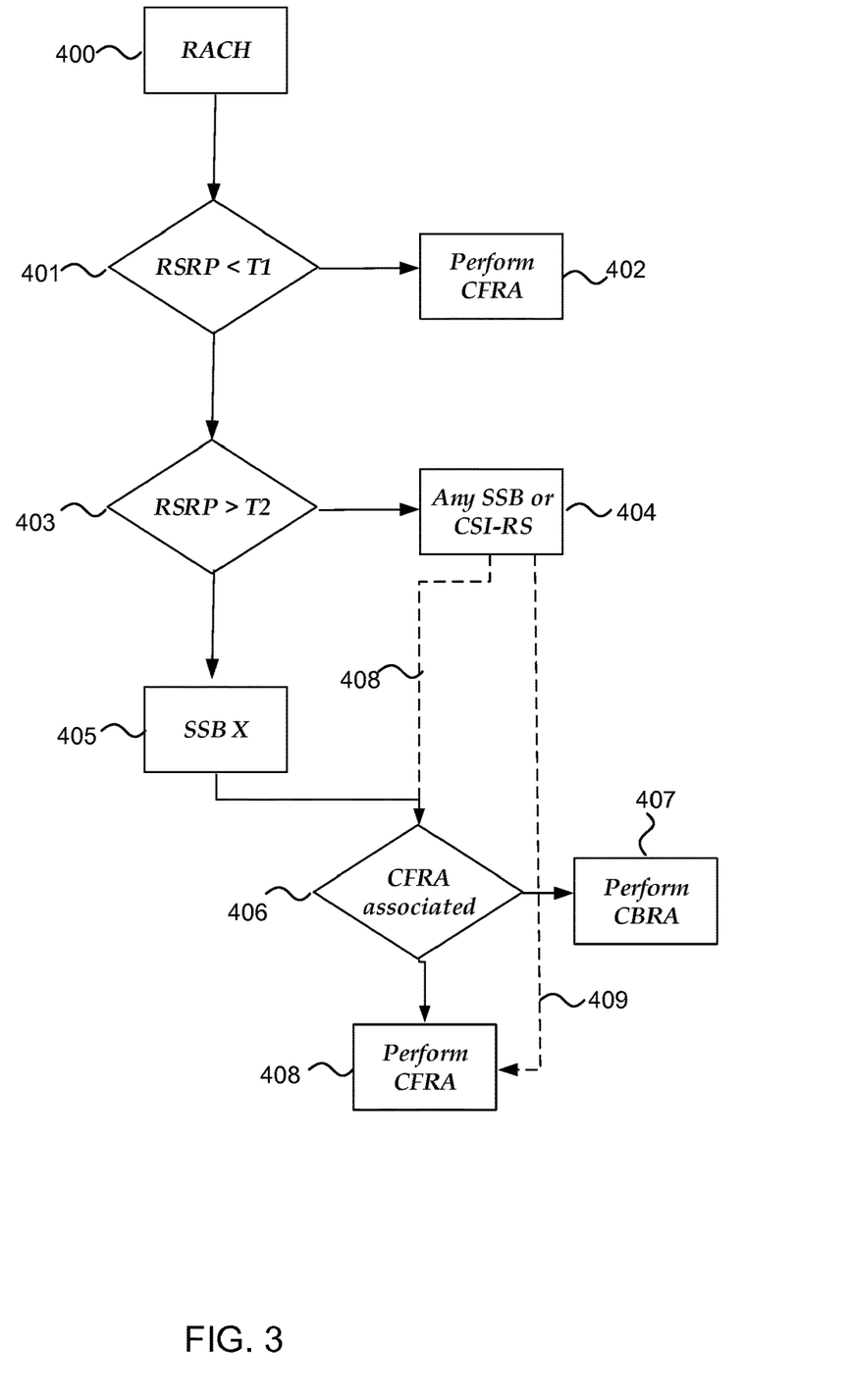
FIG. 3 shows an example embodiment of the subject matter described herein illustrating a method for RACH procedure.

FIG. 3 shows an example embodiment of the subject matter described herein illustrating a method for RACH procedure.

According to an example embodiment, the method comprises triggering RACH procedure in operation 400. This may be performed so that client device 100 detects one of the reasons to trigger RACH for accessing the network.

In operation 401, it is checked if none of the SSBs or CSI RSs, which are associated with CFRA resources, has an RSRP above a threshold T1. In operation 401, the RSRPs from all SSBs and/or CSI-RS, which have CFRA resources, are tested. Consequently, the client device 100 may check and detect if the RSRPs are below the threshold T1. If none of the SSBs or CSI-RS associated with CFRA resources has RSRP above the threshold T1, the method proceeds to operation 403.

In case there is one or more RSRP above T1, there is performed CFRA on one of the SSBs or CSR-RSs in operation 402 to perform the random access. Client device 100 may perform this operation directly.

In case all RSRPs are smaller than T1, a predefined rule may be inspected. For example, RSRP is checked if it is above another threshold T2 in operation 403. In operation 403, the RSRPs of all SSBs are checked, with or without CFRA resources. The client device 100 checks if there is at least one of the SSBs with RSRP above the threshold T2.

In operation 405, if there is one or more SSB with RSRP above the threshold T2, one of these called SSB X, for example the strongest SSB, is selected. Consequently, the client device 100 selects an SSB with RSRP above the threshold T2.

Otherwise, the client device 100 may select any SSB, for example the strongest SSB, as shown in operation 404. If there is no RSRP above T2, any SSB can be selected for further processing. Furthermore, the client device 100 may select a CSI-RS with CFRA resources, for example the strongest CSI-RS for further processing.

For the selected SSB, there is checked if CFRA resources, which are associated with the respective SSB, have been explicitly provided in operation 406. The client device 100 may detect if the CFRA resources associated for example with SSB X have been explicitly provided by the network node device 110. The operation of detecting CFRA being associated for any SSB is illustrated by the dashed line 408. The network, for example by the network node device 110 may configure the client device 100 with a dedicated RACH preamble so that the CFRA resources are explicitly provided.

In operation 408 if the CFRA resources are provided and detected, CFRA can be performed on the selected SSB to perform the random access. For example, the client device 100 performs CFRA on SSB X or any selected SSB. In case CSI-RS with CFRA resource is selected as illustrated by the dashed line 409, the client device 100 performs CFRA on CSI-RS.

Otherwise if there is no CFRA associated, CBRA is performed in operation 407 on the selected SSB to perform the random access. For example, client device 100 performs CBRA on SSB X.

In an example embodiment where T2>=T1, the SSB selected above T2 threshold does not come with CFRA resources. CBRA fallback is performed (given SSBs with CFRA are checked against T1 in the operation 401). However, for the scenario where T2<T1, an example embodiment can allow usage of CFRA for SSBs that have T2<=RSRP<T1.

According to an example embodiment, if none of the CSI-RSs or SSBs associated with CFRA has an RSRP above threshold T1, the client device 100 can still perform CFRA instead of CBRA if it selects an SSB that is associated with CFRA resources that have been explicitly provided by the network.

In one example embodiment, the network node device 110 indicates in the hand over, HO, command whether the client device 100 shall (or shall not) use the CFRA resource also when SSB is selected under the threshold. This ensures the network node device 110 not to falsely estimate the beam RSRP to be above the threshold when CFRA is used by the client device 100.

In one example embodiment, the client device 100 indicates to the network node device 110 if the RSRP was below threshold and CFRA was used. This can be informed in a form of MAC CE or L1 UCI (Uplink Control Information). MAC CE may be a simple LCID indicating this. Additionally it may include information about the beam RSRP. L1 UCI may be a single bit indication. It may also include information about the beam RSRP.

In one example embodiment, in case the network node device 110 indicates Backoff Indicator (BI) in a Random Access Response, and the client device 100 needs to reattempt preamble transmission, the CFRA is allowed to be used with the conditions above. This may decrease both, the load on the CBRA preambles as well as the Random Access latency given the backoff does not apply to CFRA.

It is to be understood that the order in which operations 400-408 are performed, may vary from the example embodiment depicted in FIG. 3. Example embodiment in FIG. 3 is also not essential as a whole to performance and operation, but different kind of combination and features may be applied as well instead of the process described in FIG. 3.

The method and any operation may be performed by the client device 100 of FIG. 1A. Further features of the method directly result from the functionalities and parameters of the client device 100 and/or the network node device 110. The method can be performed by computer program(s) or programmable logic and components.

An apparatus may comprise means for performing any aspect of the method(s) described herein. According to an example embodiment, the means comprises at least one processor, and memory comprising program code, the at least one processor, and program code configured to, when executed by the at least one processor, cause performance of any aspect of the method.

The functionality described herein can be performed, at least in part, by one or more computer program product components such as software components. According to an example embodiment, the client device 100 and/or network node device 110 comprise a processor configured by the program code when executed to execute the example embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and Graphics Processing Units (CPUs).

Any range or device value given herein may be extended or altered without losing the effect sought. Also any example embodiment may be combined with another example embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one example embodiment or may relate to several example embodiments. The example embodiments are not limited to those that solve any or all of the stated problems or those that have any or all of the stated benefits and advantages. It will further be understood that reference to 'an' item may refer to one or more of those items.

The operations of the methods described herein may be carried out in any suitable order, or simultaneously where appropriate. Additionally, individual blocks may be deleted from any of the methods without departing from the spirit and scope of the subject matter described herein. Aspects of any of the example embodiments described above may be combined with aspects of any of the other example embodiments described to form further example embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various example embodiments have been described above with a certain degree of particularity, or with reference to one or more individual example embodiments, those skilled in the art could make numerous alterations to the disclosed example embodiments without departing from the spirit or scope of this specification.

The invention claimed is:

1. A client device, comprising:
   at least one processor; and
   at least one memory storing instructions that, when executed by the at least one processor, cause the client device at least to:
   receive at least one dedicated random access channel, RACH, preamble indication from a network node device having contention free random access, CFRA, resources configured for at least one synchronization signal block, SSB, or at least one channel state information-reference signal, CSI-RS;
   trigger a random access procedure;
   check whether reference signal received strengths, RSRPs, of at least one SSB and/or of at least one CSI-RS are above, equal to, or below a threshold, wherein at least one SSB or at least one CSI-RS is associated with the CFRA resources;
   in response to all the RSRPs being below or equal to the threshold, select an SSB or CSI-RS following a predefined rule, wherein the predefined rule is based on another threshold T2, check whether any of the RSRPs are above T2, select the selected one of the SSB or CSI-RS that has RSRP above the T2, and perform the CFRA on the selected SSB or CSI-RS when the selected SSB or CSI-RS is associated with the CFRA resources; and
   in response to the RSRP of any of the SSBs or CSI-RSs being above the threshold, perform the CFRA on one of the SSBs or CSI-RSs that is above the threshold, when the SSBs or the CSI-RSs are associated with the CFRA resources.

2. The client device according to claim 1, wherein the at least one memory further stores instructions that, when executed by the at least one processor, further cause the client device at least to: select any SSB or CSI-RS in response to all the RSRPs being below or equal to the T2.

3. The client device according to claim 1, wherein the at least one memory further stores instructions that, when executed by the at least one processor, further cause the client device at least to: perform a contention based random access, CBRA, on the selected SSB in response to the selected SSB not being associated with the CFRA resources.

4. The client device according to claim 1, wherein the at least one memory further stores instructions that, when executed by the at least one processor, further cause the client device at least to: receive a handover command indicating whether the client device shall use the CFRA resources to perform the CFRA on the selected SSB or CSI-RS when a corresponding RSRP is below or equal to the threshold and when the SSB or CSI-RS is selected.

5. The client device according to claim 1, wherein the at least one memory further stores instructions that, when executed by the at least one processor, further cause the client device at least to: indicate to the network node device, via an indication, whether RSRP of the CFRA resources is below or equal to the threshold and whether the CFRA is used.

6. The client device according to claim 5, wherein a medium access control, MAC, control element, CE, comprises the indication.

7. The client device according to claim 6, wherein the MAC CE comprises a logical channel indicator, LCID, having the indication.

8. The client device according to claim 6, wherein the MAC CE further comprises information about the RSRP.

9. The client device according to claim 5, wherein L1 uplink control information, UCI, comprises the indication.

10. The client device according to claim 9, wherein the L1 UCI comprises a single bit indication.

11. A client device, comprising:
at least one processor; and
at least one memory storing instructions that, when executed by the at least one processor, cause the client device at least to:
receive at least one dedicated random access channel, RACH, preamble indication from a network node device having contention free random access, CFRA, resources configured for at least one synchronization signal block, SSB, or at least one channel state information-reference signal, CSI-RS;
trigger a random access procedure;
check if reference signal received strengths, RSRPs, of at least one SSB and/or of at least one CSI-RS are above, equal to, or below a threshold, wherein at least one SSB or at least one CSI-RS is associated with the CFRA resources;
if all the RSRPs are below or equal to the threshold, select an SSB or CSI-RS following a predefined rule, and perform the CFRA on the selected SSB or CSI-RS when the selected SSB or CSI-RS is associated with the CFRA resources; and
if the RSRP of any of the SSBs or CSI-RSs is above the threshold, perform the CFRA on one of the SSBs or CSI-RSs that is above the threshold, when the SSBs or the CSI-RSs are associated with the CFRA resources;
receive a backoff indicator, BI, in a random access response from the network node device; and
in case the client device performs a reattempt preamble transmission, perform the CFRA in response to RSRP of the CFRA resources being below or equal to the threshold and in response to the CFRA resources being configured by the network node device.

12. A method, comprising:
receiving by a client device at least one dedicated random access channel, RACH, preamble indication from a network node device having contention free random access, CFRA, resources configured for at least one synchronization signal block, SSB, or at least one channel state information-reference signal, CSI-RS;
triggering, by the client device a random access procedure;
checking, by the client device, whether reference signal received strengths, RSRPs, of at least one SSB and/or of at least one CSI-RS are above, equal to, or below a threshold, wherein at least one SSB or at least one CSI-RS is associated with the CFRA resources;
in response to all the RSRPs being below or equal to the threshold, selecting by the client device an SSB or CSI-RS following a predefined rule, wherein the predefined rule is based on another threshold T2, checking whether any of the RSRPs are above T2, selecting the selected one of the SSB or CSI-RS that has RSRP above the T2, and performing the CFRA on the selected SSB or CSI-RS when the selected SSB or CSI-RS is associated with the CFRA resources; and
in response to the RSRP of any of the SSBs or CSI-RS being above the threshold, performing by the client device the CFRA on one of the SSBs or CSI-RSs that is above the threshold, when the SSBs or the CSI-RSs are associated with the CFRA resources.

13. A non-transitory computer program product comprising program instructions that, when executed by an apparatus, cause the apparatus to perform the method according to claim 12.

14. The method according to claim 12, further comprising selecting any SSB or CSI-RS in response to all the RSRPs being below or equal to the T2.

15. The method according to claim 12, further comprising performing a contention based random access, CBRA, on the selected SSB in response to the selected SSB not being associated with the CFRA resources.

16. The method according to claim 12, further comprising receiving a handover command indicating whether the client device shall use the CFRA resources to perform the CFRA on the selected SSB or CSI-RS when a corresponding RSRP is below or equal to the threshold and when the SSB or CSI-RS is selected.

17. The method according to claim 12, further comprising indicating to the network node device, via an indication, whether RSRP of the CFRA resources is below or equal to the threshold and whether the CFRA is used.

18. The method according to claim 17, wherein a medium access control, MAC, control element, CE, comprises the indication.

19. The method according to claim 17, wherein L1 uplink control information, UCI, comprises the indication.

20. The method according to claim 12, wherein:
the method further comprises receiving a backoff indicator, BI, in a random access response from the network node device; and
in case the client device performs a reattempt preamble transmission, perform the CFRA in response to RSRP of the CFRA resources being below or equal to the threshold and in response to the CFRA resources being configured by the network node device.

\* \* \* \* \*